March 8, 1932.  R. BERINGER  1,849,032

CLUTCH MECHANISM FOR SYNCHRONIZING TRANSMISSIONS

Filed May 4, 1929  3 Sheets-Sheet 1

Inventor
Roscoe Beringer

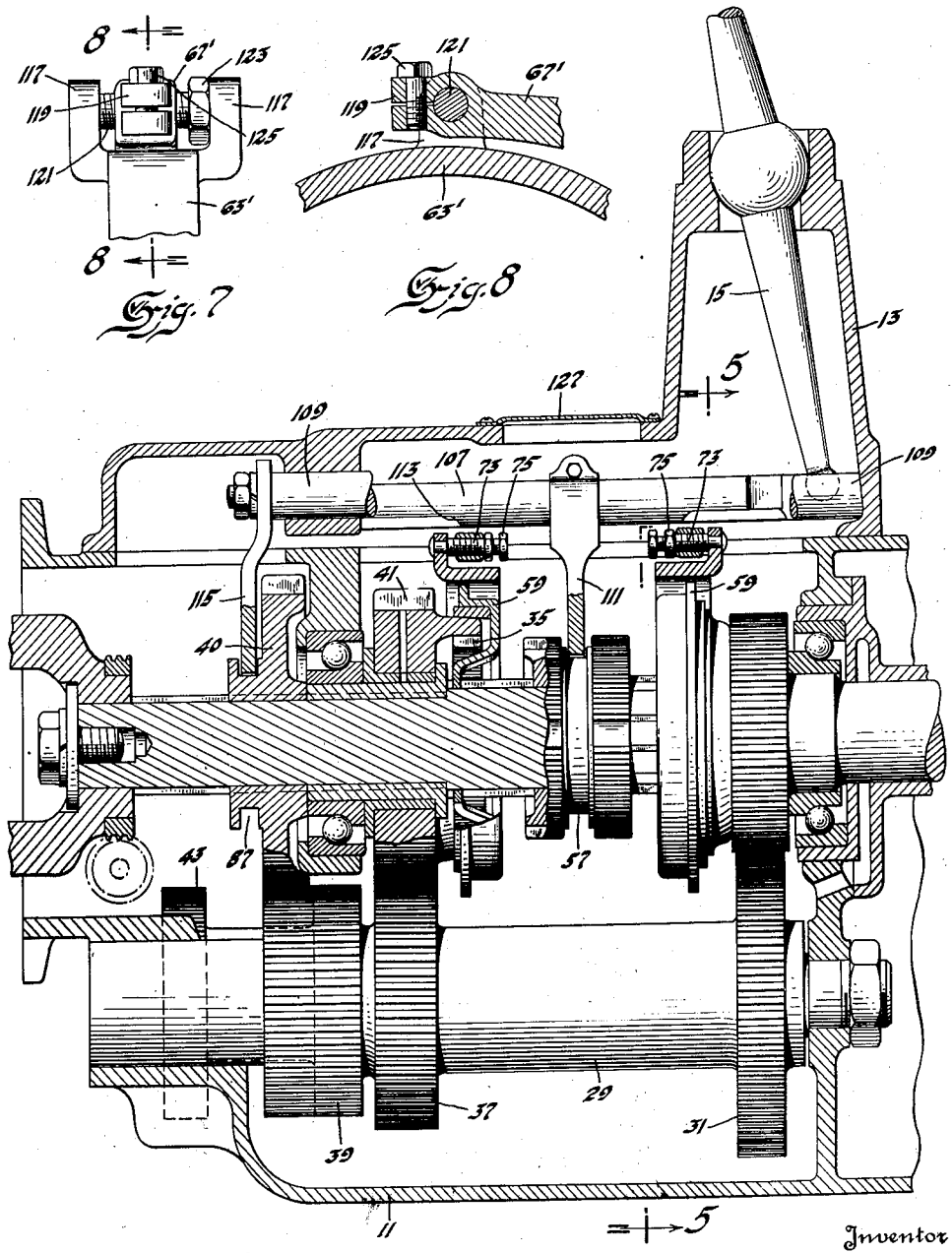

March 8, 1932. R. BERINGER 1,849,032
CLUTCH MECHANISM FOR SYNCHRONIZING TRANSMISSIONS
Filed May 4, 1929 3 Sheets-Sheet 3
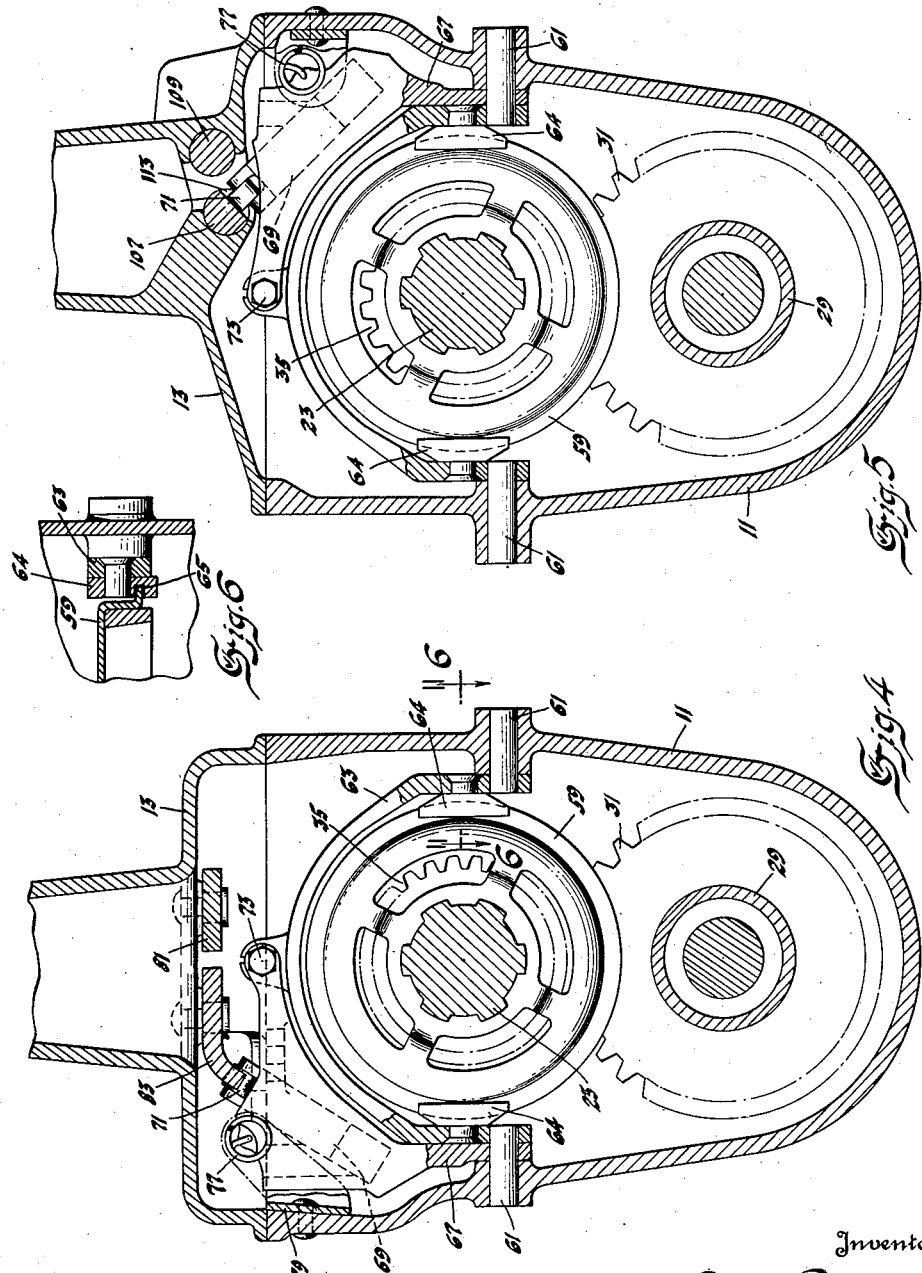
Inventor
Roscoe Beringer Patented Mar. 8, 1932

1,849,032

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

CLUTCH MECHANISM FOR SYNCHRONIZING TRANSMISSIONS

Application filed May 4, 1929. Serial No. 360,576.

This invention relates to transmission mechanism and has been designed as an improvement in a synchronizing transmission for use on motor vehicles.

As in prior synchronization transmissions, I make use of a friction clutch and a positive clutch, the former to effect synchronization prior to the engagement of the latter.

A primary object of the present invention is to provide for conveniently adjusting the operating means for the friction clutch member of the synchronizing device.

Another object is to avoid the necessity of compromise between the end clearance of the transmission main shaft and the yoke travel as has heretofore been the practice.

Other objects will be understood from the following description.

In the drawings:

Figure 3 is a longitudinal section through a somewhat modified form.

Figure 4 is a transverse section on line 4—4 of Figure 1.

Figure 5 is a transverse section on line 5—5 of Figure 3.

Figure 6 shows a detail in section on line 6—6 of Figure 4.

Figure 7 is a view in elevation of a modified detail.

Figure 8 is a section on line 8—8 of Figure 7.

Figures 1, 2:
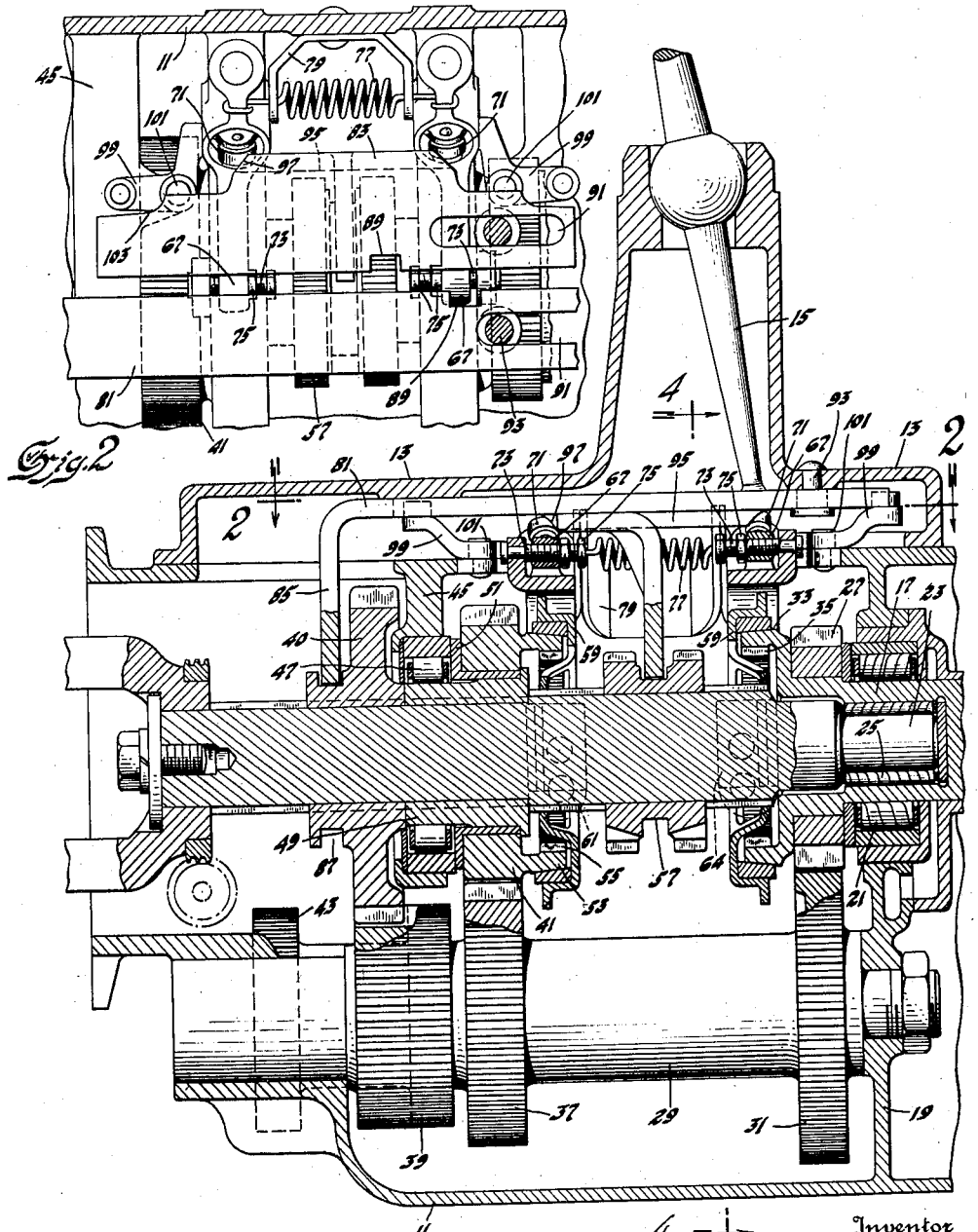
Figure 1 is a longitudinal section through a transmission embodying my invention.
Figure 2 is a horizontal section on line 2—2 of Figure 1, showing the internal mechanism in plan view

Referring by reference characters to the drawings, numeral 11 represents a transmission housing having a separable cover 13 and an operating lever 15. A driving shaft 17 is rotatably supported in a front wall 19 by anti-friction bearings 21. Its end is recessed to rotatably support the reduced end of an alined driven shaft 23, there being anti-friction bearings 25. On the end of shaft 17 is a gear 27, this being one of the constant mesh gears between the driving shaft and the countershaft 29. The countershaft is as shown rotatably supported in the end walls of the casing. Gear 27 meshes with gear 31 rigid with the countershaft. The extreme end of shaft 17 has a ring portion formed externally with a frictional conical surface 33 and internally with clutch teeth 35. The countershaft has a second speed driving gear 37 and a low speed driving gear 39. Gear 37 is in constant mesh with a gear 41 rotatable about the driven shaft. On the driven shaft is a slidable gear 40 to mesh with gear 39 for driving at low speed or with an idler gear 43 for driving in reverse  The idler gear 43 is constructed as a double gear, its rear portion being the element engaged by gear 40 for reverse driving and its front element being in constant engagement with the front portion of gear 39 as indicated in the drawings.

Between gears 40 and 41 is a partition 45 containing a bearing 47 for the driven shaft, this location of the bearing being preferred since it avoids any long overhang for gears 40 and 41 and thereby diminishes shaft deflection. Preferably the inner bearing race 49 is extended and the gear 41 surrounds this race extension and also a ring and retaining member designated by numeral 51.

Gear 41, like the end of shaft 17, has a ring 53 externally coned to form a friction surface and internally formed with clutch teeth 55. Slidable on the spline shaft is a double tooth clutch 57 operable to engage teeth 35 on shaft 17 or teeth 55 of gear 41. When in engagement with teeth 35, the drive is direct from the driving shaft to the driven shaft. When in engagement with teeth 55, the drive is at second or intermediate speed.

It has heretofore been proposed to effect synchronization by first frictionally engaging relatively movable members and thereafter positively clutching. My transmission so operates. Adjacent the second speed gear 41 and also adjacent the clutch ring on the end of shaft 17 are spider members 59 which are splined to the shaft and have conical faces to engage the co-operating conical faces on the clutch members associated with shaft 17 and gear 41. The arrangement for operating each friction clutch is the same and the description of the means associated with shaft 17 and shown in Figure 4 will be sufficient to explain the action of both.

Pivoted to the casing at 61 is a yoke 63. Adjacent the pivots are pivoted operating members 64 to move the clutch ring 59. The clutch ring and the operating member 64 are interlocked as designated by numeral 65 in Figure 6. Also pivoted on one of the pivots 61 is an arm 67 in which reciprocates a plunger 69 which terminates in a roller 71. Although not shown in the drawings, this plunger is normally thrust outwardly by resilient means. This is a known construction and not herein claimed per se. The arm 67 extends to the midpoint of yoke 63 and an adjusting device is there provided to determine the relative position of the yoke and arm. The adjustment comprises a bolt 73 rotatable in but held from axial movement in the yoke. The bolt 73 is threaded through the end of the arm and by turning the bolt, the arm and yoke are relatively adjusted. When adjusted, they may be held by nut 75. A spring 77 may be attached to this arm 67 and to the corresponding arm associated with the yoke at the second speed gear. The spring pulls the two arms toward each and against a stop 79 secured to the casing. If, due to wear of the cone faces, or to excessive end clearance of the shaft 23, the yoke is in such a position when the transmission is in neutral that the friction clutch members are spaced too far apart, it is possible by the adjusting means 73 to change the position of the yoke relative to the arm and therefore also the position of the clutch member 59 relative to the co-operating friction clutch member.

The means for operating the transmission mechanism comprises a pair of shift rails 81 and 83. Rail 81 terminates in a fork 85 engaging the usual collar 87 on gear 40. It has a slot 89 to receive the end of lever 15 as usual and is also slotted at 91 to accommodate a guiding pin 93. Rail 83 is similarly slotted and guided. It has on its edge remote from the lever slot 89 a downturned portion for the intermediate part of its length. This downturned portion is indicated by numeral 95 on Figure 1. The ends 97 of the downturned portion engage the rollers 71. When the shift rail is moved, the cam end of the rail 97 engaging the roller pushes the arm and the yoke together and in an obvious manner effects the engagement of the friction clutch. Thereafter, and after synchronization the spring 77 between the arms 67 pulls the arm which has been moved back against the stop 79, thus releasing the friction clutch. Further movement of the shift rail, owing to its connection with clutch element 57 engages the positive tooth clutch. As a further means of positively releasing the friction clutch, there may be provided levers 99 pivoted at 101 to the casing. These levers are rotated by cam surfaces 103, one on each end of the shift rail 83. When so rotated, the lever 99 swings on its pivot and the arm of the lever remote from the shift rail engages arm 67 and moves the arm toward the stop, thereby positively releasing the friction clutch.

In Figures 3 and 5 the invention is embodied in a very similar structure and similar reference characters are employed. Differing from the form just described, Figure 5 shows cylindrical shift rods in place of the shift rails 81 and 83. In this form of the invention, also the positively releasing levers 99 are omitted. The rods are designated by numerals 107 and 109. Rod 107 carries fork 111 and is flatted near each end, the shoulders 113 between the flatted ends and the intermediate portion engaging the rollers 71 corresponding to the similarly designated rollers of the form already described. When the rod 107 is moved, the engagement of the roller with the shoulder on the rod first effects synchronization. The further movement forces the plunger into the arm and the spring between the arms, as in the previous case, releases the friction clutch. The further movement of the shift rod 107 effects the engagement of the positive clutch. Rail rod 109 carries a fork 115 for shifting the low speed and reverse driven gear 40.

Figures 7 and 8 illustrate a detail which might be substituted for the adjusting device shown by both Figure 1 and Figure 3. In Figure 7 the intermediate part of the yoke 63' has a pair of furcations 117 between which is received the threaded and split end 119 of the arm 67'. Threaded through the end 119 of the arm is a bolt 121 having a head 123. A clamping bolt 125 is secured between the split ends of the arm 119. In this form of the invention, the bolt 121 is received between the furcations 117 and when rotated, it moves the end 119 axially between the furcations 117. When the arm and yoke have been relatively adjusted as desired, the fastening means 125 is used to secure the parts in their relatively adjusted position.

The structural improvement with which this invention is primarily concerned is the adjustment of the yoke, the mechanism by which a relative adjustment is made between the yoke and the arm, its adjustment also predetermining the clearance between the friction clutch elements. Heretofore it has been necessary in similar constructions to make a compromise between the end clearance of the transmission shaft and the travel of the movable friction clutch member. It was necessary that the end clearance of the shaft be not so great as to prevent the friction clutch elements engaging. It was also necessary to provide sufficient travel for the movable element of the frictional clutch to take care of a limited amount of end movement of the transmission shaft. By the present construction, this difficulty has been avoided. It is only necessary to remove the cover of the transmission housing, or to remove a small cover plate 127 to give access to the adjusting means operable as explained above. This adjustment can be readily and accurately made and avoids the difficulty heretofore encountered of the removal of the yokes and the insertion or removal of shims.

I claim:

1. In a synchronizing transmission, a driving member, first frictional and positive clutch elements carried thereby, a co-axial driven member, a second frictional and a second positive clutch element, said elements slidable but nonrotatable on said co-axial driven member, said second frictional clutch element being formed of a first part and a second part, said first part having a clutch engaging face, a rigid stop, means to normally effect the engagement of the second part with said stop, means to effect relative axial adjustment of said parts to predetermine the clearance between the first and second frictional clutch elements, and common means to sequentially effect the action of said frictional and positive clutch elements.

2. In a synchronizing transmission, positive clutch members adapted to be brought into engagement, frictional clutch members adapted to be brought into engagement and, release prior to the engagement of the positive clutch members, operating means for said positive clutch members, mechanism engaged by and operated by said operating means to effect engagement of said frictional clutch members, releasing mechanism independent of said first mechanism operable to release said friction clutch members and means to adjust the release position of one of said friction clutch members.

3. The invention defined by claim 2 together with additional movable means actuated by said operating means to positively release said frictional clutch engagement prior to the engagement of the positive clutch members.

4. The invention defined by claim 2 together with a stop to limit the release movement of one of the friction clutch members.

In testimony whereof I affix my signature.

ROSCOE BERINGER.